(12) United States Patent
Kumazawa

(10) Patent No.: US 11,485,395 B2
(45) Date of Patent: Nov. 1, 2022

(54) FURNITURE CART

(71) Applicant: AICHI CO., LTD., Nagoya (JP)

(72) Inventor: Taku Kumazawa, Nagoya (JP)

(73) Assignee: AICHI CO., LTD., Nagoya (JP)

( * ) Notice: Subject to any disclaimer, the term of this patent is extended or adjusted under 35 U.S.C. 154(b) by 0 days.

(21) Appl. No.: 17/059,257

(22) PCT Filed: May 28, 2019

(86) PCT No.: PCT/JP2019/021084
§ 371 (c)(1),
(2) Date: Nov. 27, 2020

(87) PCT Pub. No.: WO2019/230717
PCT Pub. Date: Dec. 5, 2019

(65) Prior Publication Data
US 2021/0206415 A1 Jul. 8, 2021

(30) Foreign Application Priority Data
May 30, 2018 (JP) .............................. JP2018-103541

(51) Int. Cl.
*B62B 3/16* (2006.01)
*B62B 3/10* (2006.01)
(Continued)

(52) U.S. Cl.
CPC .................. *B62B 3/16* (2013.01); *B62B 3/10* (2013.01); *B62B 3/1492* (2013.01); *B62B 5/06* (2013.01); *B62B 2301/04* (2013.01)

(58) Field of Classification Search
None
See application file for complete search history.

(56) References Cited

U.S. PATENT DOCUMENTS

| 555,584 | A | * | 3/1896 | Pleukharp | ............... B62B 1/004 |
| | | | | | 280/47.24 |
| 2,945,699 | A | * | 7/1960 | Berlye | ..................... B62B 3/10 |
| | | | | | 211/27 |

(Continued)

FOREIGN PATENT DOCUMENTS

| CH | 657100 | A5 * | 8/1986 | ............... B62B 1/14 |
| DE | 19543568 | A1 * | 5/1997 | ............... B62B 3/02 |

(Continued)

OTHER PUBLICATIONS

Translated copy of JP-2010100240-A (Year: 2022).*

(Continued)

*Primary Examiner* — James A Shriver, II
*Assistant Examiner* — Ian Bryce Shelton
(74) *Attorney, Agent, or Firm* — Withrow & Terranova, P.L.L.C.; Vincent K. Gustafson

(57) ABSTRACT

A furniture cart includes a body portion and at least one support portion. The body portion is provided with a pair of first casters that are arranged at one end in a first direction and are spaced apart in a second direction. The support portion is provided with a first inclined portion and a second inclined portion which support furniture. The body portion and the support portion are at least partially located in a region between the pair of first casters in a plan view so as not to interfere with the pair of first casters of a furniture cart located on the upper side when the furniture carts are stacked.

9 Claims, 9 Drawing Sheets

(51) Int. Cl.
B62B 3/14 (2006.01)
B62B 5/06 (2006.01)

(56) References Cited

U.S. PATENT DOCUMENTS

| | | | | | |
|---|---|---|---|---|---|
| 3,102,733 | A | * | 9/1963 | Burnett | B62B 1/12 |
| | | | | | 280/654 |
| 3,338,591 | A | * | 8/1967 | Rowland | B62B 3/10 |
| | | | | | 297/239 |
| 3,612,565 | A | * | 10/1971 | Zimmerman | B62B 1/10 |
| | | | | | 280/47.24 |
| 9,527,519 | B1 | * | 12/2016 | Shokouhi | B62B 3/10 |
| 10,766,515 | B2 | * | 9/2020 | Lin | B62B 3/04 |
| 2001/0054806 | A1 | * | 12/2001 | Calender | B62B 5/0083 |
| | | | | | 280/47.131 |
| 2012/0145977 | A1 | * | 6/2012 | Hufstater | B66F 5/04 |
| | | | | | 254/2 R |
| 2012/0153588 | A1 | * | 6/2012 | Shokouhi | A47C 13/005 |
| | | | | | 297/239 |

FOREIGN PATENT DOCUMENTS

| | | | | | |
|---|---|---|---|---|---|
| DE | 102016001128 A1 | * | 8/2017 | | B62B 3/006 |
| GB | 1085664 A | * | 10/1967 | | B62B 3/10 |
| JP | S62108169 U | * | 7/1987 | | |
| JP | S62108169 U | | 7/1987 | | |
| JP | S63202565 U | | 12/1988 | | |
| JP | 2000198449 A | * | 7/2000 | | |
| JP | 2000198449 A | | 7/2000 | | |
| JP | 2000198450 A | * | 7/2000 | | |
| JP | 2000198450 A | | 7/2000 | | |
| JP | 2002137740 A | * | 5/2002 | | |
| JP | 2010100240 A | * | 5/2010 | | |
| JP | 2010100240 A | | 5/2010 | | |
| JP | 2014166814 A | * | 9/2014 | | |
| JP | 2014166814 A | | 9/2014 | | |

OTHER PUBLICATIONS

Examination Report No. 1 for Australian Patent Application No. 2019277417, dated Sep. 24, 2021, 5 pages.
International Search Report (Form PCT/ISA/210) for International Application No. PCT/JP2019/021084 dated Jul. 16, 2019, 2 pages.
Notification of Transmittal of Translation of the International Preliminary Report on Patentability (Form PCT/IB/338) for International Application No. PCT/JP2019/021084 dated Dec. 10, 2020, 1 page.
International Preliminary Report on Patentability (Form PCT/IB/373) for International Application No. PCT/JP2019/021084 dated Dec. 1, 2020, 1 page.
Translation of Written Opinion of the International Searching Authority (Form PCT/ISA/237) for International Application No. PCT/JP2019/021084 dated Jul. 16, 2019, 7 pages.
Notice of Reasons for Refusal for Japanese Patent Application No. 2018-103541, dated Mar. 8, 2022, 7 pages.

* cited by examiner

FURNITURE CART

CROSS-REFERENCE TO RELATED APPLICATION

This application is the U.S. national phase under 35 U.S.C. § 371 of International Application No. PCT/JP2019/021084 filed May 28, 2019, and further claims priority to Japanese Patent Application No. 2018-103541 filed May 30, 2018, wherein the entire disclosures of the foregoing applications are hereby incorporated by reference herein.

TECHNICAL FIELD

The present disclosure relates to a cart for carrying specified furniture.

BACKGROUND ART

Patent Document 1 below discloses a cart that can load stacked chairs.

PRIOR ART DOCUMENTS

Patent Documents

Patent Document 1: Japanese Unexamined Patent Application Publication No. 2014-166814

SUMMARY OF THE INVENTION

Problems to be Solved by the Invention

The cart in the above Patent Document 1 is unable to stack itself. There is still a room for improvement in the cart.

In one aspect of the present disclosure, it is desirable that a novel furniture cart is proposed.

Means for Solving the Problems

One aspect of the present disclosure provides a stackable furniture cart comprising a body portion and at least one support portion. The body portion is provided with a pair of first casters and a pair of second casters. The pair of first casters are arranged at one end of the furniture cart in a first direction and spaced apart in a second direction that intersects the first direction. The pair of second casters are arranged at the other end which is opposite to the one end and spaced apart in the second direction. The at least one support portion is fixed to the body portion, and is provided with a first inclined portion and a second inclined portion. The first inclined portion and the second inclined portion are both inclined with respect to a vertical direction and come closer to each other toward the bottom. The first inclined portion and the second inclined portion are configured to support furniture by directly or indirectly contacting the furniture. The furniture cart is configured such that, when two of the furniture carts are stacked, the furniture cart located on an upper side is placeable on the furniture cart located on a lower side by shifting its position from the one end toward the other end in the first direction. Also, the body portion and the at least one support portion are at least partially located in a region between the pair of first casters in a plan view so as not to interfere with the pair of first casters of the furniture cart located on the upper side when the furniture carts are stacked.

With such a configuration, when two furniture carts are stacked, the body portion and the at least one support portion of the lower furniture cart do not at least partially contact the pair of first casters of the upper furniture cart. Thus, a pitch of stacking of the furniture carts can be reduced, and the furniture carts after stacked can be compactly gathered.

Another aspect of the present disclosure provides a stackable furniture cart comprising a support portion and a horizontal portion. The support portion is provided with a first inclined portion and a second inclined portion. The first inclined portion and the second inclined portion are both inclined with respect to a vertical direction. The first inclined portion and the second inclined portion face each other, and come closer to each other toward the bottom. The first inclined portion and the second inclined portion are configured to support furniture by directly or indirectly contacting the furniture. The horizontal portion is provided with a horizontal surface extending in a horizontal direction. The horizontal portion is continuous with an upper end portion of the support portion. When two of the furniture carts are stacked, the furniture cart located on an upper side at least contacts the horizontal portion of the furniture cart located on a lower side.

With such a configuration, the horizontal portion of the lower furniture cart that contacts the upper furniture cart when the two furniture carts are stacked is connected to the support portion. Thus, the furniture cart can be inhibited from being complex in configuration. Also, the upper furniture cart is supported by the horizontal portion having the horizontal surface. Therefore, a position displacement between the lower furniture cart and the upper furniture cart has less effect on the stacked carts, and thus, stacking is stable.

In one aspect of the present disclosure, the pair of first casters may be configured to turn around a rotation axis in an up-down direction. The body portion and the at least one support portion may be configured so as not to interfere with the pair of first casters, only when the pair of first casters of the furniture cart located on the upper side when the two furniture carts are stacked have a turning angle within a specified range around the rotation axis.

With such a configuration, turning of the pair of first casters of the upper furniture cart is limited in a stacked state. Restless turning of the pair of first casters can be reduced.

In one aspect of the present disclosure, the first inclined portion and the second inclined portion may be arranged to be aligned in the first direction. The at least one support portion may comprise two support portions spaced apart in the second direction. The body portion may be provided with two pillar members having a length in the first direction. One of the two pillar members may be arranged adjacent to one of the two support portions. The other of the two pillar members may be arranged adjacent to the other of the two support portions.

With such a configuration, since the support portions and the pillar members are adjacent, the pillar members may be used as guides when the furniture to be supported is fitted in the support portions.

In the above-described furniture cart, the two pillar members may be arranged between the two support portions. With such a configuration, a position displacement of the furniture supported by the two support portions is limited by the two pillar members. The furniture can be inhibited from slipping off from the two support portions.

In one aspect of the present disclosure, the furniture cart may comprise at least one horizontal portion that has a horizontal surface extending in a horizontal direction. The at least one horizontal portion is continuous with an upper end portion of the at least one support portion. When two furniture carts are stacked, the furniture cart located on the upper side may at least contact the at least one horizontal portion of the furniture cart located on the lower side.

With such a configuration, the horizontal portion of the lower furniture cart that contacts the upper furniture cart when two furniture carts are stacked is connected to the support portion. The furniture cart can be inhibited from being complex in configuration.

In one and another aspects of the present disclosure, the upper end portion of the at least one support portion may form at least a part of an upper end portion of the furniture cart. With such a configuration, since there is no component in a higher position than the support portion which is an essential component of the furniture cart, a height of an upper end of the furniture cart can be reduced, resulting in that downsizing of the furniture cart is achieved.

In one and another aspects of the present disclosure, the furniture cart may comprise a handle configured to be attachable/detachable. With such a configuration, the furniture cart can be operated with the handle.

EXPLANATION OF REFERENCE NUMERALS

1 . . . furniture cart (upper cart, lower cart), 3 . . . chair, 5 . . . table, 11 . . . body portion, 13 . . . support portion, 21 . . . first caster, 22 . . . second caster, 23 . . . vertical pillar, 25L, 25R . . . upper horizontal pillar, 27L, 27R . . . lower horizontal pillar, 29 . . . pillar member, 31 . . . plate-like member, 33 . . . first inclined portion, 35 . . . second inclined portion, 37 . . . horizontal surface, 38 . . . horizontal portion, 39 . . . horizontal surface, 40 . . . connecting portion, 41 . . . cushion member, 61 . . . handle, 63 . . . fixture, 101 . . . furniture cart, 111 . . . support portion, 113 . . . first inclined portion, 115 . . . horizontal portion, A rotation axis

MODE FOR CARRYING OUT THE INVENTION

Embodiments of the present disclosure will be described hereinafter with reference to the accompanying drawings.

1. Embodiment

[1-1. Overall Configuration]

Figure 5:
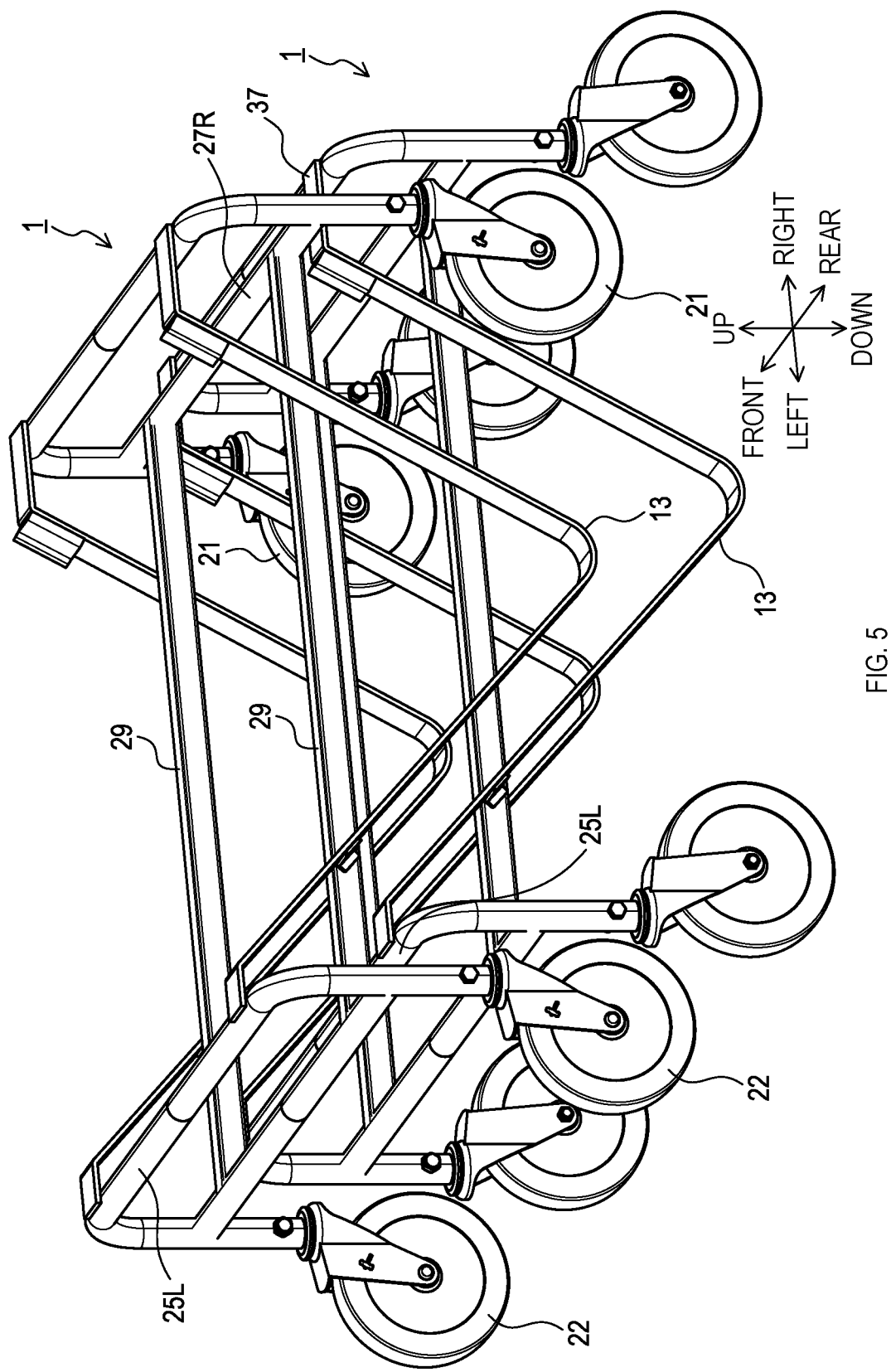
FIG. 5 is a perspective view showing the stacked furniture carts of the embodiment.

FIGS. 1 to 5 show a furniture cart 1 of the present disclosure. The furniture cart 1 is configured to be stacked, as shown in FIG. 5. Stacking herein means that a plural number of furniture carts 1 are piled at a smaller pitch than a height of the furniture cart 1. In the present embodiment, directions such as front and rear, left and right, and top and bottom may be used to describe a configuration of each component. It should be noted that those directions are used only for easy understanding of the description and not for any limitations to embodiments of the present disclosure. For example, the furniture cart 1 can be moved in a right-left direction with furniture thereon.

The furniture cart 1 comprises a body portion 11 and two support portions 13.

[1-2. Body Portion]

The body portion 11 comprises a pair of first casters 21 and a pair of second casters 22. The pair of first casters 21 are spaced apart in a front-rear direction on a right side of the furniture cart 1. The pair of second casters 22 are spaced apart in the front-rear direction on a left side of the furniture cart 1. The right-left direction corresponds to a first direction. The right side corresponds to one end. The left side corresponds to the other end. The front-rear direction corresponds to a second direction.

The pair of first casters 21 and the pair of second casters 22 described above are both provided at lower ends of vertical pillars 23 extending in an up-down direction. These four casters are configured to turn around a rotation axis A (see FIG. 2) extending in the up-down direction. Turning herein means change in orientation of a caster due to rotation, in other words, rotation of a wheel shaft around the rotation axis A. Any one or more of the four casters may be configured not to turn. For example, orientations of the pair of second casters 22 may be fixed in the right-left direction. In other words, axes of the pair of second casters 22 may be fixed in the front-rear direction.

The body portion 11 comprises upper horizontal pillars 25R, 25L, lower horizontal pillars 27R, 27L, and two pillar members 29, in addition to the four vertical pillars 23.

The two vertical pillars 23 on the right side, that is, the two vertical pillars 23 to which the pair of first casters 21 are attached are coupled to each other at upper ends thereof via the upper horizontal pillar 25R. The two vertical pillars 23 and the upper horizontal pillar 25R as a whole have an inverted U-shape. The two vertical pillars 23 are also coupled at a central portion in the up-down direction via the lower horizontal pillar 27R. The upper horizontal pillar 25R and the lower horizontal pillar 27R are parallel to each other.

The two vertical pillars 23 on the left side, the upper horizontal pillar 25L, and the lower horizontal pillar 27L respectively have the same shape as the two vertical pillars 23 on the right side, the upper horizontal pillar 25R, and the lower horizontal pillar 27R.

The lower horizontal pillar 27R on the right side and the lower horizontal pillar 27R on left side are coupled by the two pillar members 29 disposed apart in the front-rear direction. Both of the two pillar members 29 have a length in the right-left direction.

[1-3. Support Portion]

The two support portions 13 have the same shape, and are both parts of the two plate-like members 31. The two plate-like members 31 are each formed by bending an elongated plate. The two support portions 13 are spaced apart in the front-rear direction. Hereinafter, one of the support portions 13 will be described.

The support portion 13 comprises a first inclined portion 33 and a second inclined portion 35. The first inclined portion 33 has a surface facing upper left. The second inclined portion 35 has a surface facing upper right. That is, the first inclined portion 33 and the second inclined portion 35 are both inclined with respect to a vertical direction. The surface facing upper left of the first inclined portion 33 and the surface facing upper right of the second inclined portion 35 face each other and come closer to each other toward the bottom. Facing herein is not limited to a meaning in a narrow sense that the respective surfaces are parallel to each other, and also includes a positional relationship in which the respective surfaces are inclined. Such inclinations are not limited to acute angles and may be obtuse angles. The first inclined portion 33 and the second inclined portion 35 are arranged to be aligned in the right-left direction. The support portion 13 including the first and the second inclined portions 33 and 35, of the plate-like member 31, has a substantially V-shape in a front view.

The support portion 13 is configured to support furniture by having the first inclined portion 33 and the second inclined portion 35 directly or indirectly contact the furniture.

The support portion 13 has a horizontal portion 38 provided with a horizontal surface 37 extending in a horizontal direction on the right side in the plate-like member 31. The horizontal portion 38 is continuous with an upper end portion of the first inclined portion 33 of the support portion 13.

The support portion 13 has a connecting portion 40 provided with a horizontal surface 39 extending in the horizontal direction on the left side in the plate-like member 31. The connecting portion 40 is continuous with an upper end portion of the second inclined portion 35 of the support portion 13.

The first inclined portion 33 of the support portion 13 is provided with one or more cushion members 41. Therefore, the first inclined portion 33 indirectly contacts the furniture via the cushion member 41.

The plate-like member 31 is fixed to the body portion 11 by fixing a lower surface of the horizontal portion 38 to the upper horizontal pillar 25R on the right side and fixing a lower surface of the connecting portion 40 to the upper horizontal pillar 25L on the left side. Since the plate-like member 31 is fixed to the body portion 11, the support portion 13 is also fixed to the body portion 11. The plate-like member 31 is coupled to the pillar member 29 at two points spaced apart in the right-left direction by auxiliary fixtures 43. When the plate-like member 31 is fixed to the body portion 11 as such, an upper end portion of the support portion 13 forms a part of an upper end portion of the furniture cart 1. The upper end portion of the support portion 13 includes the upper end portions of the first inclined portion 33 and the second inclined portion 35 of the support portion 13.

One of the two pillar members 29 located in front is arranged adjacent to one of the support portions 13 located in front. The other of the two pillar members 29 located behind is arranged adjacent to the other of the two support portions 13 located behind. The two pillar members 29 are arranged between the two support portions 13.

FIG. 5 shows a view of the two stacked furniture carts. The furniture cart 1 located on an upper side (hereinafter, upper cart 1) when the two furniture carts 1 are stacked is configured to be placed on the furniture cart 1 located on a lower side (hereinafter, lower cart 1) by shifting its position to the left with respect to the lower cart 1. The upper cart 1 and the lower cart 1 have the same configuration and shape.

FIG. 5 shows the two stacked furniture carts 1, but there can be three or more stacked furniture carts 1.

Figure 1:
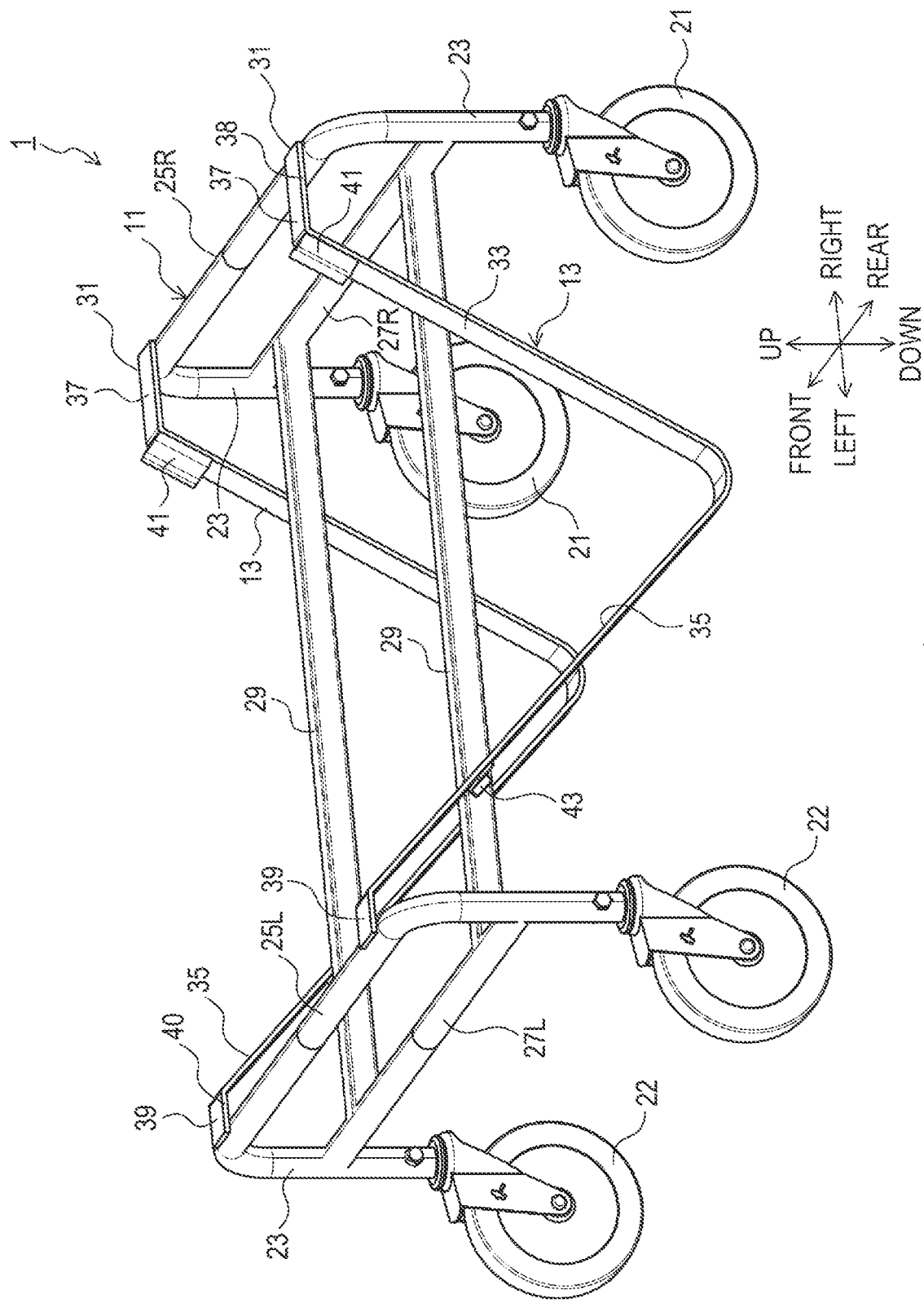
FIG. 1 is a perspective view of a furniture cart of an embodiment.
Figure 2:
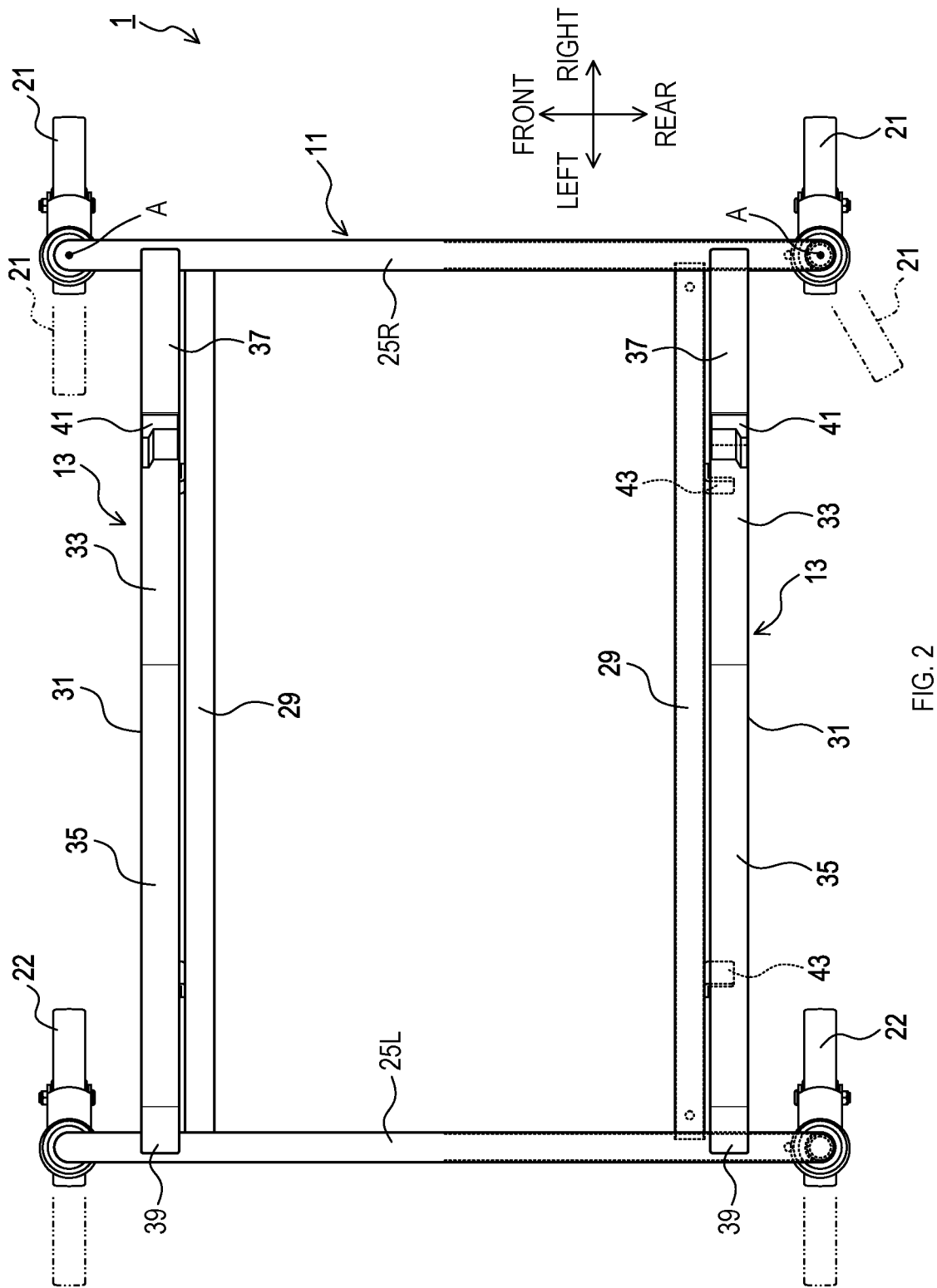
FIG. 2 is a plan view of the furniture cart of the embodiment.
Figure 3:
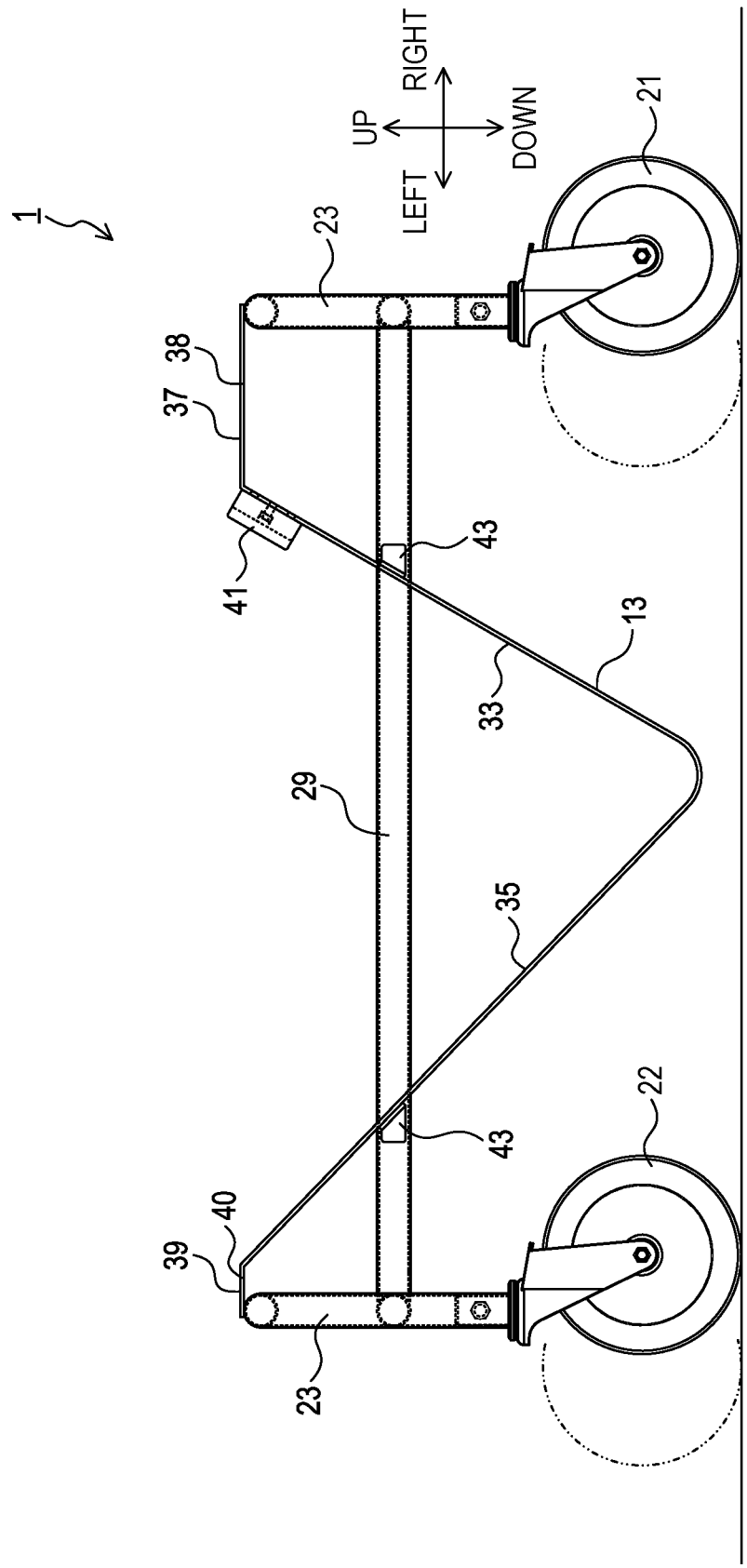
FIG. 3 is a front view of the furniture cart of the embodiment.
Figure 4:
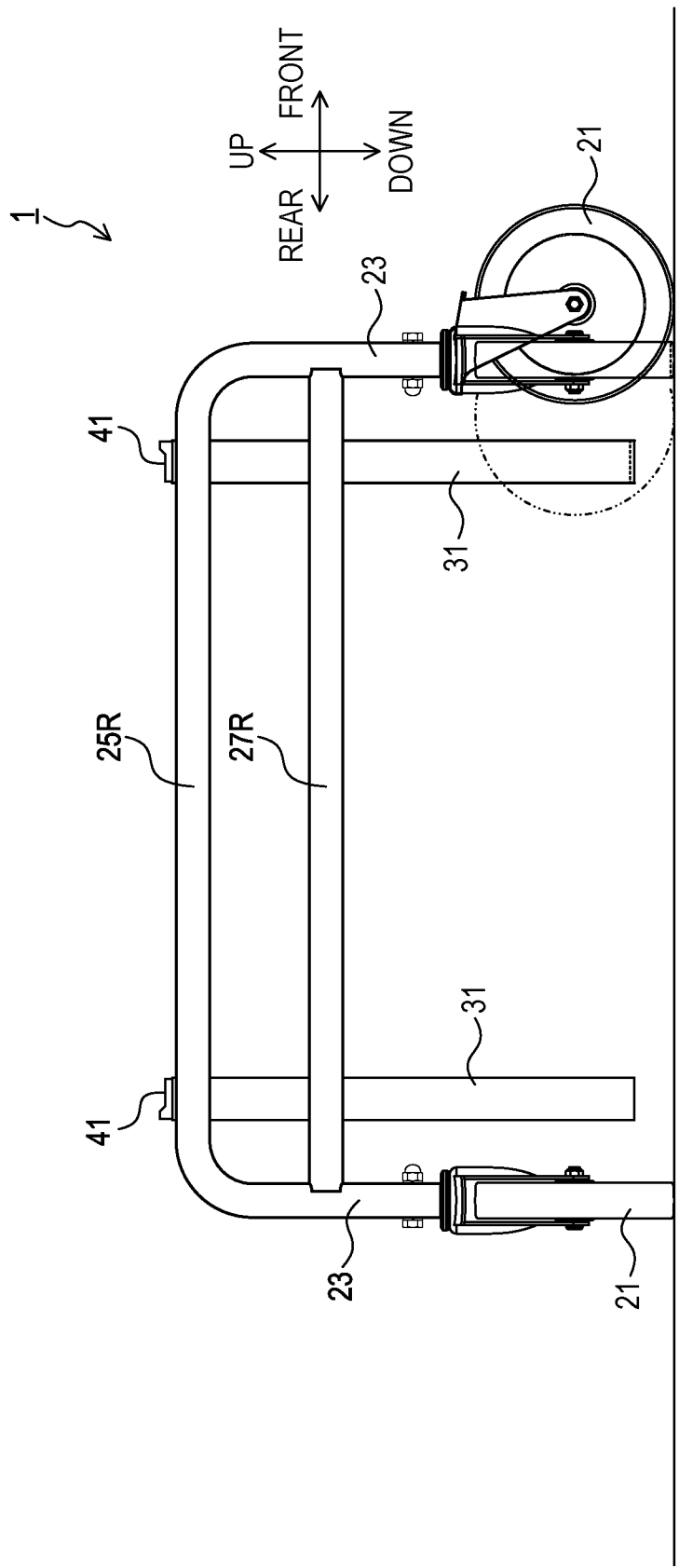
FIG. 4 is a side view of the furniture cart of the embodiment.

The body portion 11 and the support portion 13 of the lower cart 1 are configured so as not to interfere with (that is, not to contact) the pair of first casters 21 of the upper cart 1 when the two carts 1 are stacked. Specifically, as shown in FIG. 2, the pillar member 29 of the body portion 11 and the plate-like member 31 including the support portion 13 are configured to be located in a region between the pair of first casters 21 in a plan view. In other words, the two pillar members 29 and the two support portions 13 of the lower cart 1 are provided between the pair of first casters 21 of the lower cart 1 so as to fit in a space smaller than a space between the pair of first casters 21 of the upper cart 1. Also, when the two carts 1 are stacked, a lower end of the first caster of the upper cart 1 is located lower than an upper end portion of the lower cart 1.

Figure 6:
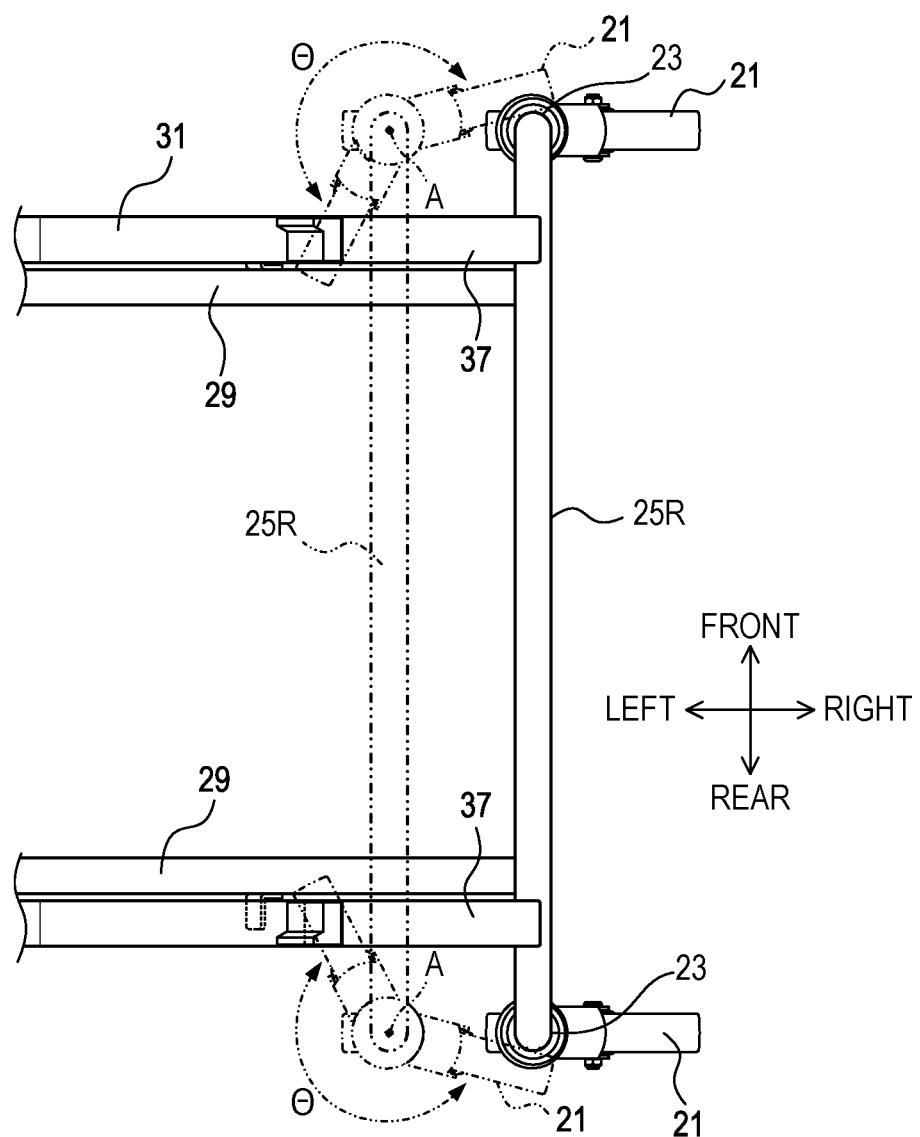
FIG. 6 is a view showing a positional relationship between a pair of first casters of the upper furniture cart and the lower furniture cart, when the furniture carts are stacked.

FIG. 6 shows, by alternate long and short dash lines, the pair of first casters 21 and the upper horizontal pillar 25R of the upper cart 1 when stacked. The body portion 11 and the support portion 13 of the lower cart 1 are configured so as not to interfere with the pair of first casters 21 of the upper cart 1 only when turning angles of the pair of first casters 21 of the upper cart 1 are within an angle range θ shown in FIG. 6. When the first caster 21 of the upper cart 1 turns, the first caster 21 comes into contact with the vertical pillar 23 or the pillar member 29. When the first caster 21 of the upper cart 1 is oriented outside the angle range θ, the first caster 21 interferes with the vertical pillar 23, the upper horizontal pillar 25R, the horizontal surface 37 (that is, the horizontal portion 38), etc. of the lower cart 1, and thus stacking is disabled. The angle range θ corresponds to a specified angle range.

The upper cart 1 contacts the respective horizontal surfaces 37 of the two horizontal portions 38 of the lower cart 1 in the lower horizontal pillar 27R. The furniture cart 1 located on the upper side contacts the upper horizontal pillar 25L of the lower cart 1 in the vicinity of left end portions of the two pillar members 29. As above, since the upper cart 1 contacts the lower cart 1 at four points, stable stacking is achieved. The horizontal surface 37 and an upper surface of the pillar member 29 have a difference in height as much as a thickness of the plate-like member 31, that is, substantially the same height. Therefore, the upper cart 1 does not tilt significantly, and is stably loaded on the lower cart 1.

[1-4. Furniture Support by Furniture Cart]

Figure 7:
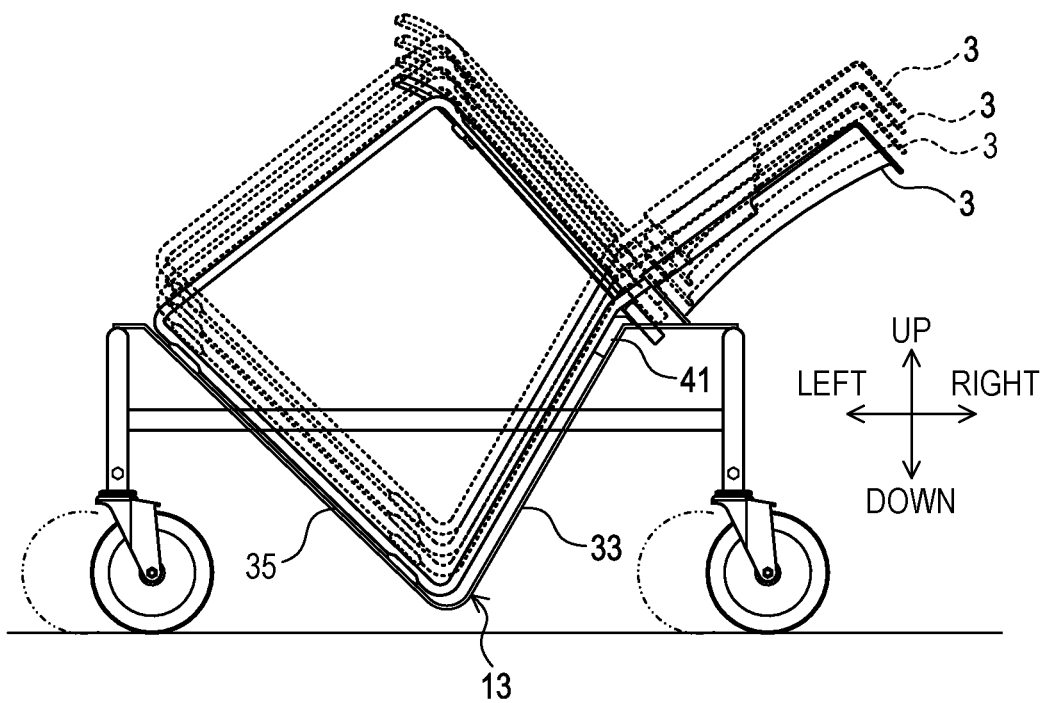
FIG. 7 is a front view showing the furniture cart of the embodiment loaded with chairs.

As shown in FIG. 7, the furniture cart 1 of the present embodiment can load a chair 3 as one example of furniture. The chair 3 itself is configured to be stacked. The furniture cart 1 can load the stacked chairs 3.

The support portion 13 supports the lowest chair 3 in the stacked chairs 3. The first inclined portion 33 indirectly contacts a leg of the chair 3 via the cushion member 41. The second inclined portion 35 directly contacts the leg of the chair 3. The support portion 13 supports the chair 3 in such a manner that the leg is held between the first inclined portion 33 and the second inclined portion 35.

[1-5. Effect]

(1a) In the furniture cart 1, the horizontal portion 38 of the lower cart 1 that contacts the upper cart 1 when a plural number of the furniture carts 1 are stacked is connected to the support portion 13. Therefore, there is no need to provide a contact surface for stacking separately from the support portion. The furniture cart 1 can be inhibited from being complex in configuration. Also, since the contact surface is the horizontal surface 37 of the horizontal portion 38, a position displacement to the right and left between the lower cart 1 and the upper cart 1 has less effect on the stacked carts 1, and thus, stacking of the lower cart 1 and the upper cart 1 is stable.

(1b) The furniture cart 1 is configured so that the body portion 11 and the support portion 13 of the lower cart 1 do not interfere with the pair of first casters 21 of the upper cart 1 when a plural number of the furniture carts 1 are stacked. If the pair of first casters 21 of the upper cart 1 contact the lower cart 1, a pitch of stacking increases. However, the furniture cart 1 of the present embodiment can reduce the pitch of stacking, and gather the stacked furniture carts 1 compactly.

(1c) The pair of first casters 21 of the upper cart 1 can turn only within the angle range θ. That is, the rotation axes A of the first casters 21 are provided closer to the support portion 13, as compared to a configuration in which the pair of first casters 21 of the upper cart 1 can freely turn while a plural number of the furniture carts 1 are stacked. Therefore, in the furniture cart 1 of the present embodiment, an increase in the space between the pair of first casters 21 can be inhibited, and the furniture cart 1 as a whole can be downsized.

While a plural number of the furniture carts 1 are stacked, the turning angle of the pair of first casters 21 is limited to the angle range θ. Thus, when the furniture carts 1 are stacked, an operation range of the pair of first casters 21 of the upper cart 1 is limited. As a result, restless turning of the pair of first casters 21 can be reduced.

(1d) One of the support portions 13 and one of the pillar members 29 are adjacent to each other, and further, the two pillar members 29 are arranged between the two support portions 13. Thus, when the chair 3 to be supported is fitted to the support portions 13, the pillar members 29 can be used as guides. Also, the pillar members 29 can limit a position displacement of the leg of the chair 3 from the support portions 13. Thus, slipping off of the supported chair 3 from the two support portions 13 can be inhibited.

(1e) The upper ends of the support portions 13 form at least part of the upper end of the furniture cart 1. That is, in the furniture cart 1, there is no component located higher than the support portions 13 which are essential components. Therefore, the upper end of the furniture cart 1 can be reduced in height. Downsizing of the furniture cart 1 can be achieved.

2. Other Embodiments

The embodiment of the present disclosure has been described in the above. However, the present disclosure is not limited to the above-described embodiment and can take various modes within the technical scope of the present disclosure.

(2a) The above-described embodiment illustrates a configuration in which the furniture cart 1 has two substantially V-shaped support portions 13. The support portion of the furniture cart is not limited to the above configuration, and is not limited to a specific shape. For example, a lower part of the first inclined portion and a lower part of the second inclined portion may be separated.

The furniture cart may comprise only one support portion, or three or more support portions.

The first inclined portion 33 may directly contact the chair 3 without using the cushion member 41. The second inclined portion 35 may indirectly contact the chair 3 by using the cushion member 41. Both of the inclined portions may directly or indirectly contact the chair 3.

In the above-described embodiment, the support portion 13 is configured by the bent plate-like member 31. The support portion may be configured by a member that is not like a plate. For example, a part of the support portion that contacts furniture may not be flat. If furniture to be loaded on the furniture cart has a specified shape, the support portion may have various shapes corresponding to the specified shape. For example, when the leg of the chair is formed from a pipe material, the contact surface of the support portion 13 with the leg may have any one of a half cylindrical shape along an outer surface of the pipe material, a U-shaped section, and a V-shaped section.

The support portion and the horizontal portion may be separate members. The support portion and the horizontal portion may not be coupled.

The upper end portion of the support portion may not form a part of the upper end portion of the furniture cart.

(2b) The above-described embodiment illustrates that the horizontal portion 38 is coupled to the support portion 13. Where to provide the horizontal portion is not specifically limited. For example, the horizontal portion may be provided separately, spaced apart from the support portion and the plate-like member.

The furniture cart may be provided with only one horizontal portion, or three or more horizontal portions. A plural number of horizontal portions may be coupled to one support portion.

When two furniture carts are stacked, the furniture cart located on the upper side may not contact the horizontal portion of the furniture cart located on the lower side. The furniture cart may not be provided with the horizontal portion.

(2c) The body portion is not limited to the configuration disclosed in the above-described embodiment. The body portion may have various configurations, as far as the body portion at least comprises a pair of first casters and a pair of second casters and a support portion is provided.

For example, the body portion may not be provided with the pillar members 29. The number of pillar members 29 may be one, or three or more. The pillar members 29 may not be adjacent to the support portions 13. The two pillar members 29 may be arranged outside the support portions 13, that is, in front of the front support portion 13 and behind the rear support portion 13.

The above-described embodiment illustrates that the pillar members 29 and the entire support portions 13 fit between the pair of first casters 21 so as not to contact the first casters 21. However, the furniture cart may be configured such that only a part of the lower cart close to the pair of first casters of the upper cart fits between the pair of first casters of the upper cart, as long as the first casters of the upper cart do not contact the lower cart when the furniture carts are stacked.

The above-described embodiment illustrates that, when each of the pair of first casters 21 has the turning angle outside the angle range θ, that is, faces inward, the pair of first casters 21 interfere with the lower cart 1. However, the pair of first casters may be configured so as not to contact the lower cart regardless of the turning angle around the rotation axis A of the pair of first casters of the upper cart.

(2d) The above-described embodiment illustrates the furniture cart 1 that can load the chair 3. The furniture cart 1 may be configured to load furniture other than the chair. For example, like a furniture cart 101 shown in FIG. 8, the furniture cart 101 may be configured to load a table 5. The table 5 is a stackable table. The furniture cart 101 can load a plural number of the tables 5.

Figure 8:
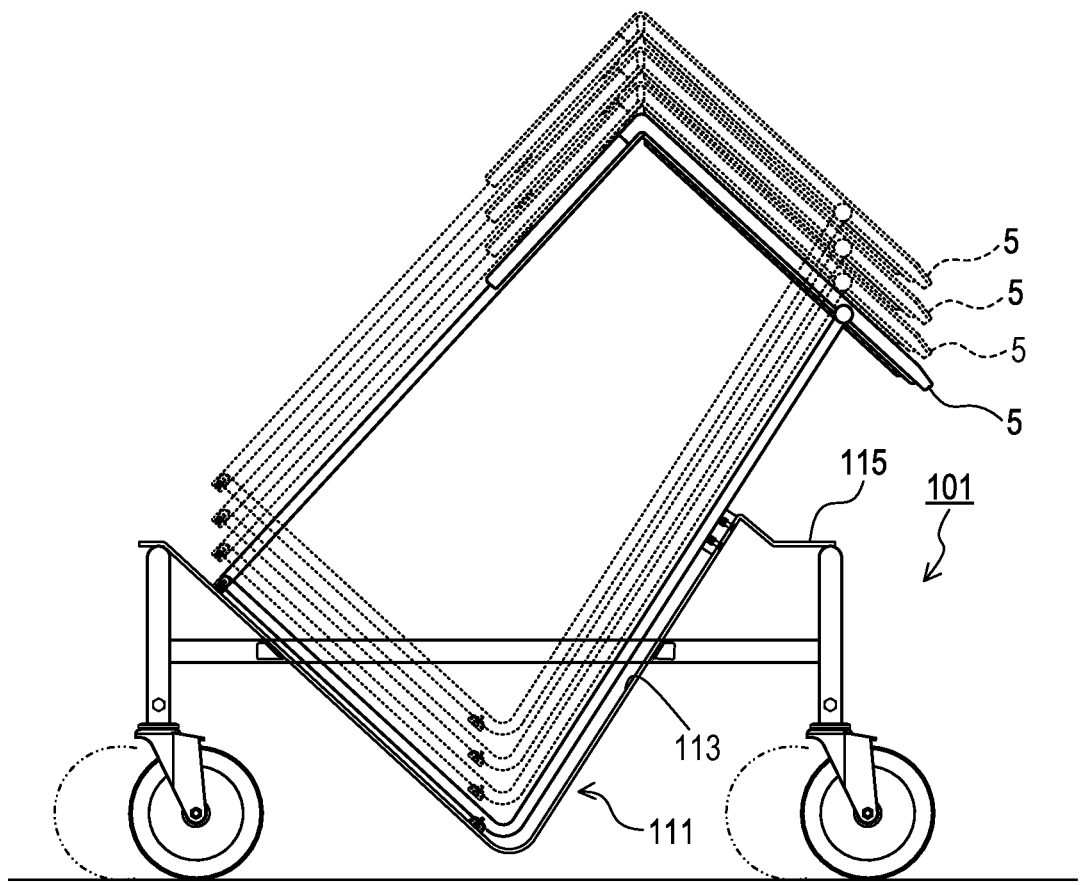
FIG. 8 shows a variation of the furniture cart, which is a front view showing the furniture cart loaded with tables.

As shown in FIG. 8, the support portion 111 is configured such that the first inclined portion 113 protrudes above the horizontal portion 115. In the configuration as such, the first inclined portion 113 can be lengthened, and can load furniture stably.

Figure 9:
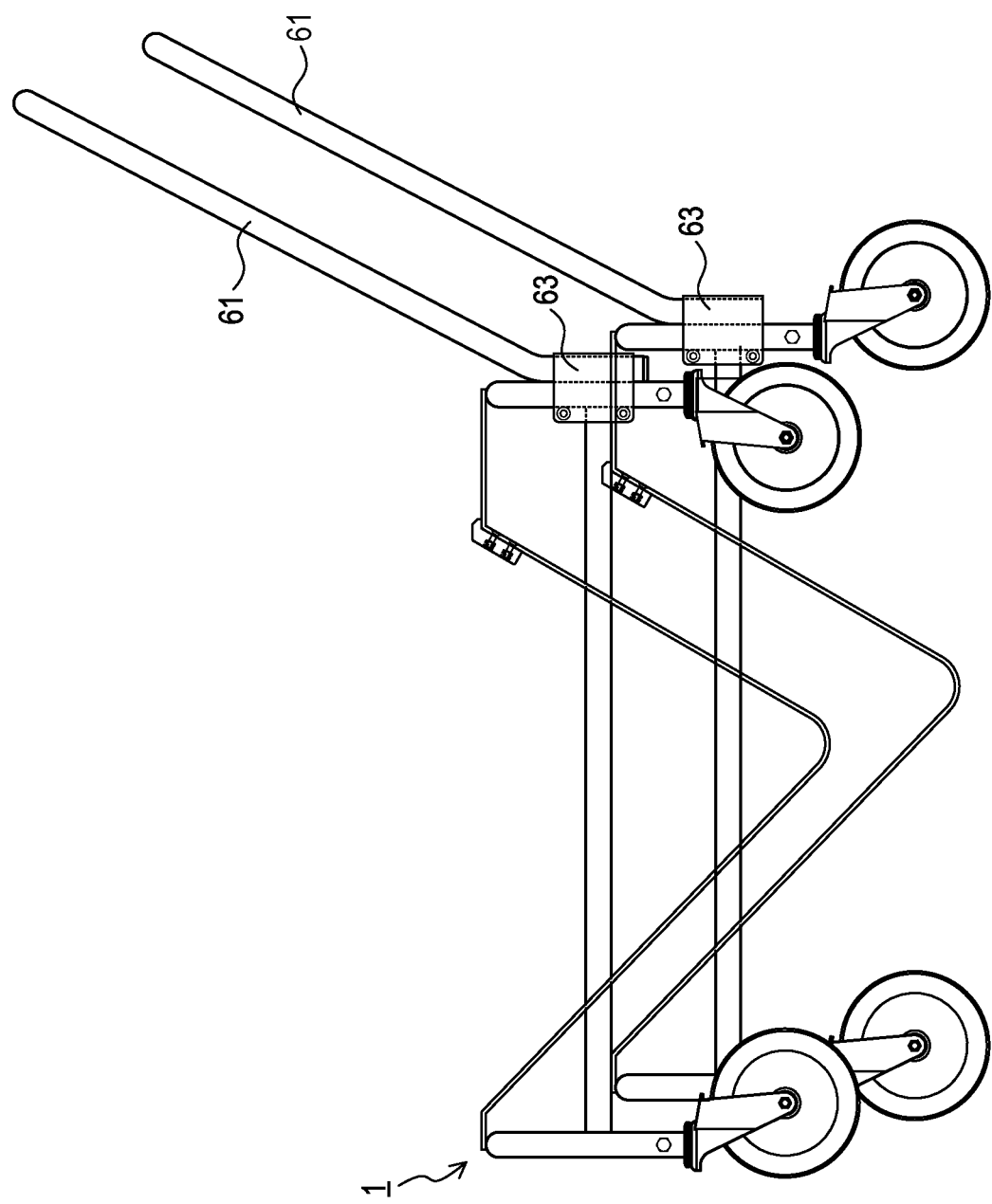
FIG. 9 shows a variation of the furniture cart, which is a front view showing the furniture cart with a handle.

(2e) The furniture cart 1, as shown in FIG. 9, may be provided with a handle 61 used to move the furniture cart 1. The handle 61 may be attachable to/detachable from the furniture cart 1. In an embodiment in FIG. 9, the handle 61 is fixed to the body portion of the furniture cart 1 using a fixture 63. The handle 61 is configured to be detached from the furniture cart 1 by removing the fixture 63.

(2f) It is illustrated that the furniture cart 1 in the above-described embodiment is stackable when the upper cart 1 and the lower cart 1 are shifted from the one end toward the other end (i.e., to the left). The upper cart 1 may be configured to be loaded on the lower cart 1 only when the upper cart 1 is shifted as mentioned above. The upper cart 1 may be configured to be loaded on the lower cart 1, only when there is no displacement in the right-left direction between the upper cart 1 and the lower cart 1.

The invention claimed is:

1. A stackable furniture cart comprising:
a body portion provided with a pair of first casters and a pair of second casters, the first casters being arranged at one end of the furniture cart in a first direction and spaced apart in a second direction that intersects the first direction, and the pair of second casters being arranged at the other end opposite to the one end and spaced apart in the second direction; and
at least one support portion fixed to the body portion, the at least one support portion being provided with a first inclined portion and a second inclined portion, the first inclined portion and the second inclined portion being both inclined with respect to a vertical direction and coming closer to each other toward the bottom, the first inclined portion and the second inclined portion being configured to support furniture by directly or indirectly contacting the furniture, wherein:
the furniture cart is configured such that, when two of the furniture carts are stacked, the furniture cart located on an upper side is offset in the first direction relative to the furniture cart located on a lower side, and
the body portion and the at least one support portion of the furniture cart located on the lower side are configured to fit between the pair of first casters of the furniture cart located on the upper side when the furniture carts are stacked.

2. A stackable furniture cart comprising:
a support portion provided with a first inclined portion and a second inclined portion, the first inclined portion and the second inclined portion being both inclined with respect to a vertical direction, the first inclined portion and the second inclined portion facing each other and coming closer to each other toward the bottom, the first inclined portion and the second inclined portion being configured to support furniture by directly or indirectly contacting the furniture; and
a horizontal portion provided with a horizontal surface facing upward, extending in a horizontal direction and continuous with an upper end portion of the support portion,
wherein, when two of the furniture carts are stacked, the furniture cart located on an upper side contacts, from above, the horizontal surface of the furniture cart located on a lower side.

3. A stackable furniture cart comprising:
a body portion provided with a pair of first casters and a pair of second casters, the first casters being arranged at one end of the furniture cart in a first direction and spaced apart in a second direction that intersects the first direction, and the pair of second casters being arranged at the other end opposite to the one end and spaced apart in the second direction; and
at least one support portion fixed to the body portion, the at least one support portion being provided with a first inclined portion and a second inclined portion, the first inclined portion and the second inclined portion being both inclined with respect to a vertical direction and coming closer to each other toward the bottom, the first inclined portion and the second inclined portion being configured to support furniture by directly or indirectly contacting the furniture, wherein:
the furniture cart is configured such that, when two of the furniture carts are stacked, the furniture cart located on an upper side is offset in the first direction relative to the furniture cart located on a lower side,
the body portion and the at least one support portion are at least partially located in a region between the pair of first casters in a plan view so as not to interfere with the pair of first casters of the furniture cart located on the upper side when the furniture carts are stacked,
the pair of first casters are configured to turn around a rotation axis in an up-down direction, and
the body portion and the at least one support portion of the furniture cart located on the lower side when the two furniture carts are stacked are configured to contact the pair of first casters of the furniture cart located on the upper side, thereby to avoid further rotation of the pair of first casters of the furniture cart located on the upper side when the pair of first casters of the furniture cart located on the upper side rotates around the rotation axis.

4. A stackable furniture cart comprising:
a body portion provided with a pair of first casters and a pair of second casters, the first casters being arranged at one end of the furniture cart in a first direction and spaced apart in a second direction that intersects the first direction, and the pair of second casters being arranged at the other end opposite to the one end and spaced apart in the second direction; and
at least one support portion fixed to the body portion, the at least one support portion being provided with a first inclined portion and a second inclined portion, the first inclined portion and the second inclined portion being both inclined with respect to a vertical direction and coming closer to each other toward the bottom, the first inclined portion and the second inclined portion being configured to support furniture by directly or indirectly contacting the furniture; wherein
the furniture cart is configured such that, when two of the furniture carts are stacked, the furniture cart located on an upper side is offset in the first direction relative to the furniture cart located on a lower side,
the body portion and the at least one support portion are at least partially located in a region between the pair of first casters in a plan view so as not to interfere with the pair of first casters of the furniture cart located on the upper side when the furniture carts are stacked,
the first inclined portion and the second inclined portion are arranged to be aligned in the first direction,
the at least one support portion comprises two support portions spaced apart in the second direction,
the body portion is provided with two pillar members having a length in the first direction, one of the two pillar members is arranged adjacent to one of the two support portions, a part of at least the one of the two support portions being located lower than the one of the two pillar members, and the other of the two pillar members is adjacent to the other of the two support portions, a part of at least the other of the two support portions being located lower than the other of the two pillar members.

5. The furniture cart according to claim 4, wherein the two pillar members are arranged between the two support portions.

6. The furniture cart according to claim 1, comprising:

at least one horizontal portion having a horizontal surface extending in a horizontal direction and continuous with an upper end portion of the at least one support portion, wherein, when the two furniture carts are stacked, the furniture cart located on the upper side at least contacts the at least one horizontal portion of the furniture cart located on the lower side.

7. The furniture cart according to claim 1, wherein an upper end portion of the at least one support portion forms at least a part of an upper end portion of the furniture cart.

8. The furniture cart according to claim 1, comprising an attachable/detachable handle.

9. A furniture cart stackable in an up-down direction comprising:

a body portion provided with a pair of first casters and a pair of second casters, the first casters being arranged at one end of the furniture cart in a first direction and spaced apart in a second direction that intersects the first direction, and the pair of second casters being arranged at the other end opposite to the one end and spaced apart in the second direction; and at least one support portion fixed to the body portion, the at least one support portion being provided with a first inclined portion and a second inclined portion, the first inclined portion and the second inclined portion being both inclined with respect to a vertical direction and coming closer to each other toward the bottom, the first inclined portion and the second inclined portion being configured to support furniture by directly or indirectly contacting the furniture, wherein:

the furniture cart is configured such that, when two of the furniture carts are stacked, the furniture cart located on an upper side is offset in the first direction relative to the furniture cart located on a lower side, and also at least a part of the at least one support portion of the furniture cart located on the upper side is located between the first inclined portion and the second inclined portion of the support portion of the furniture cart located on the lower side, and the body portion and the at least one support portion are at least partially located in a region between the pair of first casters in a plan view so as not to interfere with the pair of first casters of the furniture cart located on the upper side when the furniture carts are stacked.

* * * * *